(12) United States Patent
Herzog (10) Patent No.: US 10,821,513 B2
(45) Date of Patent: Nov. 3, 2020

(54) DEVICE FOR PRODUCING THREE-DIMENSIONAL OBJECTS AND A CORRESPONDING METHOD

(71) Applicant: CL SCHUTZRECHTSVERWALTUNGS GMBH, Lichtenfels (DE)

(72) Inventor: Frank Herzog, Lichtenfels (DE)

(73) Assignee: Concept Laser GmbH, Lichtenfels (DE)

( * ) Notice: Subject to any disclaimer, the term of this patent is extended or adjusted under 35 U.S.C. 154(b) by 226 days.

(21) Appl. No.: 15/570,987

(22) PCT Filed: May 30, 2016

(86) PCT No.: PCT/EP2016/062182
§ 371 (c)(1),
(2) Date: Oct. 31, 2017

(87) PCT Pub. No.: WO2016/202566
PCT Pub. Date: Dec. 22, 2016

(65) Prior Publication Data
US 2018/0222117 A1    Aug. 9, 2018

(30) Foreign Application Priority Data

Jun. 15, 2015   (DE) .................. 10 2015 109 525

(51) Int. Cl.
*B22F 3/105*  (2006.01)
*B33Y 10/00*  (2015.01)
(Continued)

(52) U.S. Cl.
CPC .......... *B22F 3/1055* (2013.01); *B29C 64/153* (2017.08); *B29C 64/245* (2017.08);
(Continued)

(58) Field of Classification Search
CPC ........................ B29C 64/255; B29C 64/259
See application file for complete search history.

(56) References Cited

U.S. PATENT DOCUMENTS 7,357,629 B2 * 4/2008 Weiskopf ............... B33Y 10/00
                                                              425/188
8,845,319 B2   9/2014 Oberhofer et al.
(Continued)

FOREIGN PATENT DOCUMENTS

DE   202006016477 U1   12/2006
DE   102006032025 A1    2/2007
(Continued)

OTHER PUBLICATIONS

International Search Report Corresponding to Application No. PCT/EP2016/062182 dated Sep. 13, 2016.
(Continued)

*Primary Examiner* — Jacob T Minskey
*Assistant Examiner* — Virak Nguon
(74) *Attorney, Agent, or Firm* — Dority & Manning, P.A.

(57) ABSTRACT

A device (1) for producing three-dimensional objects (2) by successive solidifying of layers of a structural material (3) that can be solidified by means of radiation at the locations corresponding to the respective cross-section of the object (2), comprising a housing (4) surrounding a process chamber (5), a structure holder (6) arranged therein, an applicator device (7) for applying layers of the structural material (3) onto a supporting device (8) in the structure holder (6) or a previously formed layer, comprising a coating element (9) guided in a coating application direction over a structure surface of the structure holder (6), a metering unit for feeding the structure material (3) to the application device (7), an irradiation device (12) for irradiating layers of structural material (3) at the locations corresponding to the
(Continued)

respective cross-section of the object (2) with a focused energy beam.

16 Claims, 6 Drawing Sheets

(51) Int. Cl.
  *B33Y 30/00*   (2015.01)
  *B29C 64/153*  (2017.01)
  *B33Y 40/00*   (2020.01)
  *B29C 64/255*  (2017.01)
  *B29C 64/245*  (2017.01)
  *B29C 64/343*  (2017.01)

(52) U.S. Cl.
  CPC .......... *B29C 64/255* (2017.08); *B29C 64/343* (2017.08); *B33Y 10/00* (2014.12); *B33Y 30/00* (2014.12); *B33Y 40/00* (2014.12); *B22F 2003/1056* (2013.01); *Y02P 10/295* (2015.11)

(56) References Cited

U.S. PATENT DOCUMENTS

| | | | |
|---|---|---|---|
| 9,486,961 B2 * | 11/2016 | Okazaki | B33Y 30/00 |
| 2007/0026099 A1 * | 2/2007 | Hagiwara | B22F 3/004 |
| | | | 425/174.4 |
| 2011/0252618 A1 | 10/2011 | Diekmann et al. | |
| 2011/0278773 A1 | 11/2011 | Bokodi et al. | |
| 2013/0064707 A1 * | 3/2013 | Matsui | B29C 64/165 |
| | | | 419/61 |
| 2013/0241095 A1 | 9/2013 | Korten et al. | |
| 2014/0165381 A1 * | 6/2014 | Rauschenbach | B22F 3/1055 |
| | | | 29/592.1 |
| 2014/0302187 A1 * | 10/2014 | Pawlikowski | B29C 67/0085 |
| | | | 425/174.4 |
| 2017/0001258 A1 * | 1/2017 | Hildebrand | B23K 26/0093 |

FOREIGN PATENT DOCUMENTS

| | | | | |
|---|---|---|---|---|
| DE | 102009020987 A1 * | 11/2010 | ........... | B29C 64/153 |
| DE | 102009020987 A1 | 11/2010 | | |
| DE | 102009036153 A1 * | 2/2011 | ........... | B29C 64/153 |
| DE | 102010020416 A1 | 11/2011 | | |
| DE | 102009036153 A1 | 2/2012 | | |
| EP | 2377672 A2 | 10/2011 | | |
| EP | 2386405 A1 | 11/2011 | | |
| EP | 2463081 A1 | 6/2012 | | |
| JP | H09500845 A | 1/1997 | | |
| JP | 2001334580 A | 12/2001 | | |
| WO | WO96/14203 | 5/1996 | | |
| WO | 2011023714 A1 | 3/2011 | | |

OTHER PUBLICATIONS

German Search Report Corresponding to Application No. 102015109525 dated Sep. 19, 2018.
Machine Translated Japanese Office Action Corresponding to Application No. 2017556571 dated Dec. 20, 2018.

* cited by examiner

DEVICE FOR PRODUCING THREE-DIMENSIONAL OBJECTS AND A CORRESPONDING METHOD

CROSS-REFERENCE TO RELATED APPLICATIONS

This application is a United States national stage entry of an International Application serial no. PCT/EP2016/062182 filed May 30, 2016 which claims priority to German Patent Application serial no. 10 2015 109 525.4 filed Jun. 15, 2015. The contents of these applications are incorporated herein by reference in their entirety as if set forth verbatim.

The invention relates to a device for producing three-dimensional objects by successive solidifying of layers of a structural material that can be solidified by means of radiation at the locations corresponding to the respective cross-section of the object, and a method that can be carried out in conjunction with such a device.

Such types of devices, by means of which generative construction processes can be carried out, particularly laser sintering or laser fusing processes, have a housing surrounding a process chamber and a structure holder arranged therein. The structure holder can either be fastened permanently under a process chamber floor or designed as a removable holder fastened under a process chamber floor. It is also possible to arrange a structure holder and a metering holder and an overflow holder in a so-called exchange module and to introduce said three holders as a whole into a production device and to interlock them accordingly there under the process chamber.

In order to deliver structure material in layers, there is an application device comprising a coating element guided in a coating application direction over a structure surface of the structure holder. A metering unit serves to feed the structure material to the application device, for which a metering holder having a height adjustable structure material feeding platform can be provided. Other metering units with which structure material can be provided for the coating unit are also conceivable, however.

An irradiation device serves to irradiate the structure material at the locations corresponding to the respective cross-section of the object. A focused laser beam in particular is used for this, which fuses the structure material to or on the powder layer at the locations to be solidified. Cooling produces a solidification of the structure material. Other radiation sources can also be used instead of a laser.

The structure holder can be a separate removable holder, as it is described in DE 198 46 478, for example.

In devices according to the prior art, there is a problem in that the existing structure holders normally cannot be optimally utilized, even if they are removable. This is disadvantageous in multiple respects. First of all, for example, an unnecessarily large quantity of structure material must be layered in an oversized structure holder, which is associated with high structure material costs. Second of all, unnecessarily long travel paths over a construction field of unnecessarily large dimensions significantly extend the construction times for an object.

The problem to be solved by the invention is that of describing a device and a method by which construction costs and construction time can be saved and, in doing so, the use of a construction device can be designed to be more variable. Said problem is solved according to the characterizing features of claim 1 in that structure holders adapted to the object shape and of different sizes and/or cross-sectional shapes can be introduced into the device, wherein in the assembled end position, the structural dimension thereof is shorter in the coating application direction than in a direction at a right angle thereto.

The invention thus provides improvements in a plurality of respects. To begin with, the structure holders are adapted to the object shape. "Adapted to the object shape" in connection with the structure holders means that in the case of an object that is designed as a panel element, an adapted structure holder is chosen that provides a narrow, long cross-section shape, wherein the dimensions of the construction field are adapted to the cross-section length and cross-section width of the object. An example is a door element that is generatively structured in an SLM or SLS device. The door element has a width of 60 cm and a thickness of 5 cm, wherein a curvature of the door is included in the calculation. The door height should equal 30 cm. The door element is to be structured standing substantially vertical in the structure holder. The structure holder dimensions then advantageously equal approx. 65 cm×10 cm, the structure holder adapted to the object shape must be suitable to ensure a platform lowering by at least 40 cm so that the door object can be structured standing vertically in the structure holder by gradually moving the platform in the Z-direction.

Such a structure holder adapted to the object shape is then inserted into the system in the transverse direction, so that in the assembled end position, the structural dimension thereof is shorter in the coating application direction, that is, in the direction in which the coater travels over the structure surface, than in a direction at a right angle thereto.

For the aforementioned structure holder adapted to the object shape having a construction field length of 65 cm and a construction field width of 10 cm, this means that the coater must have a length of at least 65 cm and the travel path of the coater—if the area of the metering unit and the area of the overflow opening of the overflow holder are included—can be reduced to approx. 20 cm. The core of the invention thus consists of an object shape adaptation of the structure holder and an assembly position of said structure holder in the device that accelerates the coating.

The structure holder does not necessarily have to be designed to be right-angled. In order to reduce the holder volume, a shape adaptation of the construction field beyond that of downsizing the cross-sections can occur. If an S-shaped object is constructed, for example, then an S-shaped structure holder also comes into question, the construction area boundary of which is adapted to the shape of the object to be produced.

Naturally, "adapted to the object shape" is always understood to involve a certain amount of compromise. There must be sufficient space around the object for structure material, but this space must be minimized so that as little excess structure material must be introduced into the holder as possible.

In order to be able to install such kinds of holders in a device having the features described in claim 1, it can be advantageous if the process chamber floor is prepared to receive structure holders of varying sizes and cross-section shapes and has one or more construction field openings that are shape-adapted or modifiable in respect to the size or cross-section shape thereof. To do so, the process chamber floor can either be provided with a plurality of inserts into or under which the corresponding structure holders having the shape adaptation can be inserted. It is also possible, however, to raise the process chamber floor as a whole out of the device and to insert an adapted process chamber floor having an adapted opening into the device.

Arranging the structure holder edge at minimal distance to the opening of the metering holder edge in order to avoid unnecessarily long travel paths between the two holders is essential for acceleration of the process.

If there is a plurality of construction field openings in a process chamber floor, then the construction field openings of the process chamber floor that are not currently required for a construction process can be sealed by insert plates. It is also possible to variably select the position of the structure holder and/or of the overflow holder relative to the position of the metering chamber. This means, for example, that a relatively narrow structure holder is initially inserted in an insert opening and then an adapted overflow holder is inserted directly behind. The smaller the volume of the structure holder, the smaller the volume of the overflow holder can also be chosen to be. Said holder is variably selected and inserted relative to the position of the metering holder and optimized in respect of the distance. Structure holder and overflow holder can be arranged in a common opening of the process chamber floor and occupy only a part of said opening. A remaining part of the opening is then covered by an insert plate.

The invention also includes the arranging of a metering holder having an adapted volume, a structure holder that is adapted to the object shape and a likewise adapted overflow holder in operational arrangement permanently in a process chamber floor, a process chamber floor insert or a removable module having a process chamber floor.

By means of a structure holder change, the travel path of the coater can be automatically adapted to the required coating length based on the structure holder, particularly to the collectively selected holder configuration, metering holder, structure holder, overflow holder. The wider the holders are, the longer the travel length of the coater must also be selected to be. It would be conceivable, for example, to code the holder and to scan the coding with a sensor of the device so that an optimal coating length is automatically set by the coater travel electronics.

If larger quantities of an object are to be produced, then the structure holder adapted to the object shape that can be inserted in the device can also be produced by a generative construction process based on construction data of an object to be created therein. The outer dimensions of the object are used, a certain distance is added to the dimensions of the object and then a structure holder adapted to the object shape is then generatively structured based on the data generated in this way. This has the advantage that the structure holder can then also be specially adapted to the thermally sensitive regions of the object. A generatively structured structure holder enables the introducing of cooling channels in temperature-critical zones, and the generative construction process can also thus be improved, and particularly accelerated.

According to the invention, it is also possible that the structure holder can have at least one movable side wall for reducing or enlarging the construction area thereof, which is arranged crosswise to the coating application direction. An object shape adaptation occurs by moving the at least one side wall. Such a variable structure holder can be designed either as a removable container or also installed in an exchange module, so that, by moving the structure wall, an optimization of the construction speed and a reduction of the required construction material quantity can be achieved.

According to the method claims, a construction device having a housing enclosing a process chamber, a structure holder housed or insertable therein, an application device for applying the structure material to a supporting device in the structure holder or a previously formed layer is initially provided by a coater element guided over a structure surface of the structure holder in a coating application direction. Then there is a metering unit for feeding the structure material to the application device, and an irradiation device serves to solidify the structure material for fusing.

According to the method, the dimensions of an object to be produced are first determined and a plurality of structure holders of different sizes, shapes or volumes are readied, the structure holder dimensions or shape features of the structure holders are saved in a memory of the device, and then a structure holder adapted to the object is electronically selected from the plurality of reserved structure holders by comparison of the object dimension data and structure holder data, and finally the object-adapted structure holder is arranged and mounted in the device such that in the assembled end position, the structure surface dimensions of the structure holder adapted to the shape of the object is shorter in the coating application direction than in a direction at a right angle thereto. Such a "multi-holder device" thus contains a plurality of holders, i.e. at least two, i.e. at least one large-volume holder and at least one that is significantly smaller in size. The holder selection occurs automatically based on holder data that is saved. As soon as the dimensions of the object are determined from the structure data, a holder is selected and used that minimizes the coating routes. According to the invention, the plurality of holders can be reserved in a holder exchange magazine and selected by a control apparatus of the device and automatically inserted into the device. The device thereby optimizes itself in respect of the holder adaptation.

The invention is explained in more detail based on an embodiment in the figures. These show.

Figure 1:
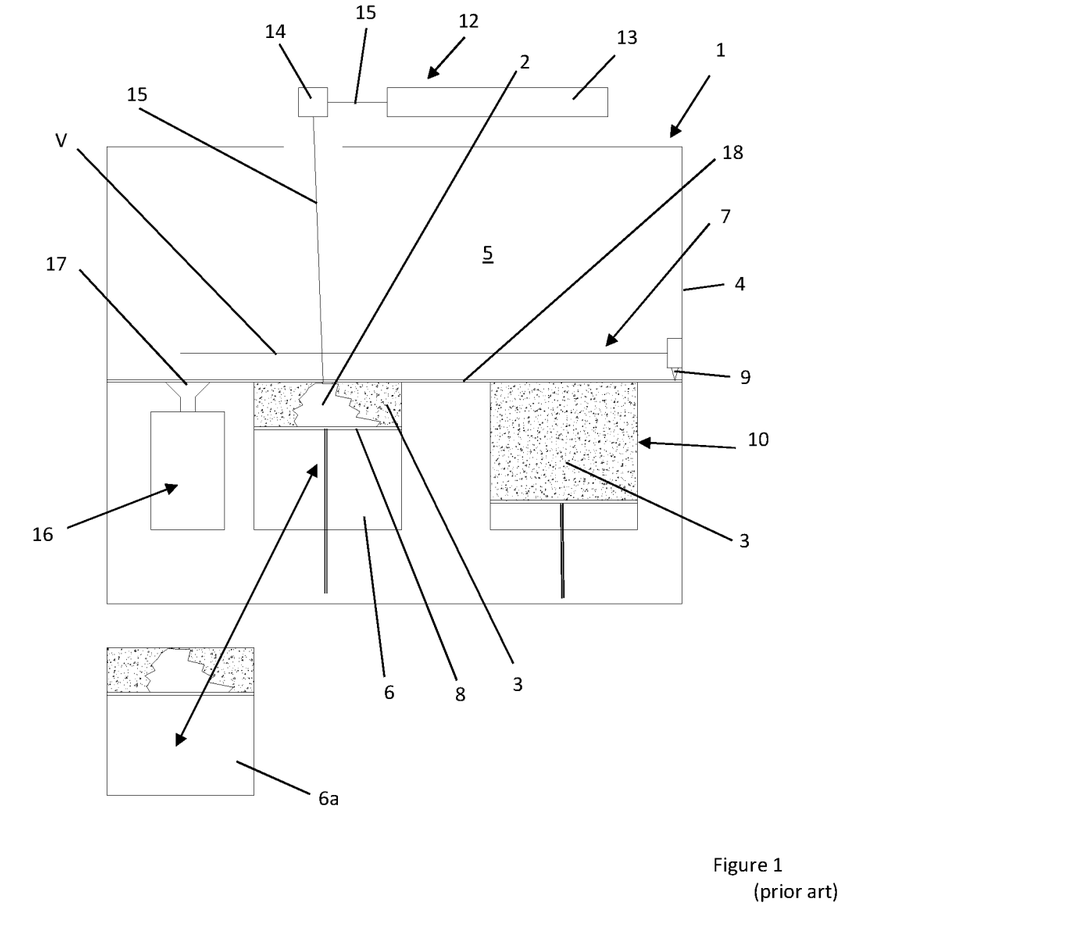
FIG. 1 A schematic sectional view of a device for producing three-dimensional objects having a structure holder that is designed as a removable holder, according to the prior art.

Reference is first made to the elements of FIG. 1 (prior art). The device 1 shown there serves to produce three-dimensional objects 2 by successive solidifying of layers of a structural material 3 that can be solidified by means of radiation at points corresponding to the respective cross-section of the object 2. The device 1 has a housing 4 that encloses a process chamber 5. A structure holder 6 is arranged under the process chamber 5. An application device 7 serves to apply layers of the structure material 3 to a supporting device 8 in the structure holder 6 or a previously formed layer. The application device 7 has a coater element 9 guided in a coating application direction over a structure surface of the structure holder 6. A metering unit having a metering holder 10 serves to feed the structure material 3 to the application device 7.

An irradiation device 12 for irradiating the layers of the structure material 3 is provided over the process chamber 5, wherein the irradiation device 12 comprises a laser 13 and a scanner apparatus 14, by means of which a laser beam 15 can be directed to the locations of the structure material 3 to be solidified by deflection via a plurality of scanner mirrors in a manner known per se.

The structure holder 6 in the shown embodiment according to FIG. 1 is a separate removable holder and can be moved from a position in the device 1 to an external device (position 6*a*). It is also possible to provide a plurality of holders and to exchange them cyclically, for example, so that an object 2 that has been produced in such a removable holder can cool.

An overflow holder 16 having an overflow opening 17 is also provided on the side of the structure holder 6 opposite the metering holder 10. The openings of the metering holder 10, the structure holder 6 and the overflow holder 16 are fastened or fastenable under correspondingly sized openings of a process chamber floor 18.

Figure 2:
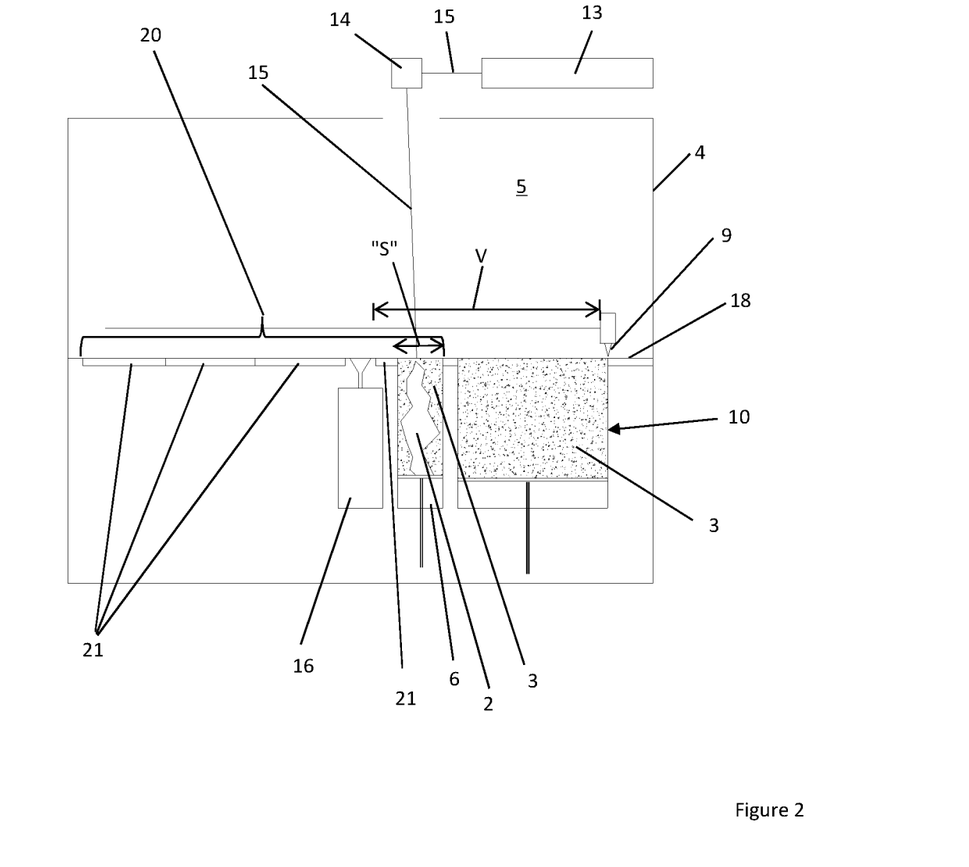
FIG. 2 A view similar to FIG. 1, in which the structure holder is adapted to the object shape and the overflow holder is adapted to the size of the structure holder.

FIG. 2 shows that the structure holder 6 is designed as a structure holder adapted to the object shape. Said structure holder that is adapted to the object shape has as small a distance as possible from the side walls thereof to the outer contours of the object 2, which can range from a few millimeters to a few centimeters. The extent to which significant cost savings can be achieved by shortening the coater routes or by saving construction material, compared to the additional costs that a structure holder that is adapted to the object shape causes under certain circumstances, will always play a role in the object 6 shape adaptation.

FIG. 2 clearly shows that the structure holder 6 is built relatively narrowly in the coating application direction "S;" e.g. a ratio of the dimensions thereof in the coating application direction "S" to a dimension at a right angle thereto in the direction "L" is 1:4 or 1:6, for example. Deviations may also be necessary here, of course, entirely dependently on the dimensions and shape of the object.

FIG. 2 furthermore shows that the process chamber floor 18 has a relatively large opening in which the structure holder 6 that is adapted to the object shape and the adapted overflow holder 16 can be inserted. Said opening 20 is sealed by insert plates 21, insofar as it is not required.

Figure 3:
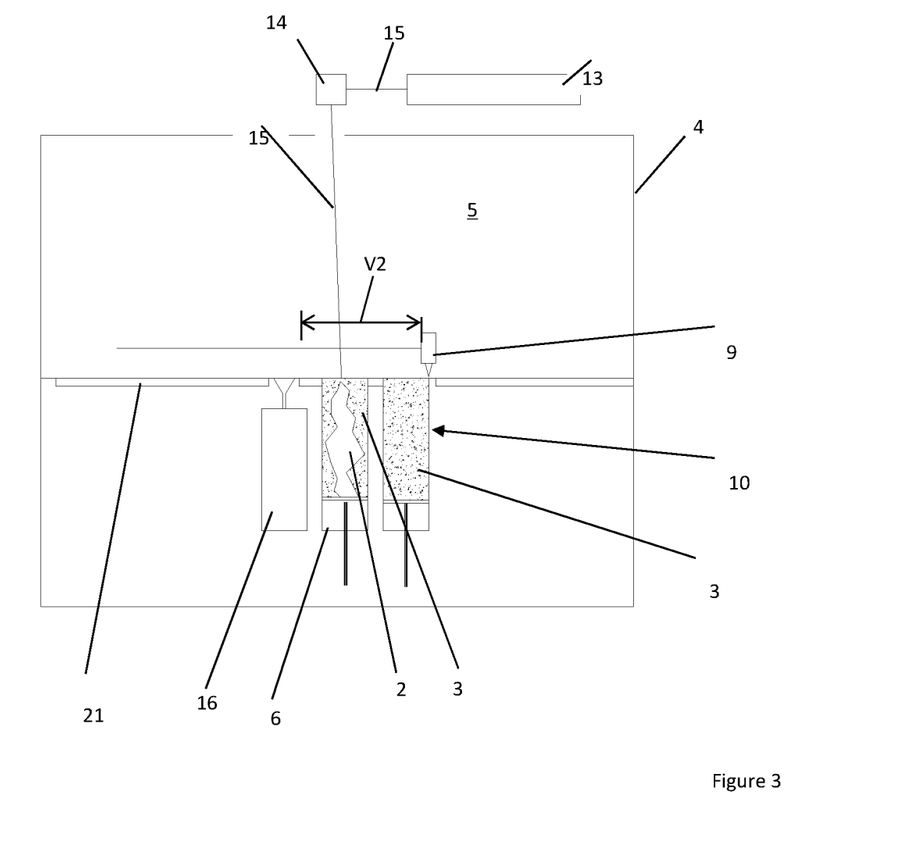
FIG. 3 A view according to FIGS. 1 and 2, in which the metering holder is also designed as an exchangeable and adapted holder in respect of the construction material quantity thereof.
Figure 4:
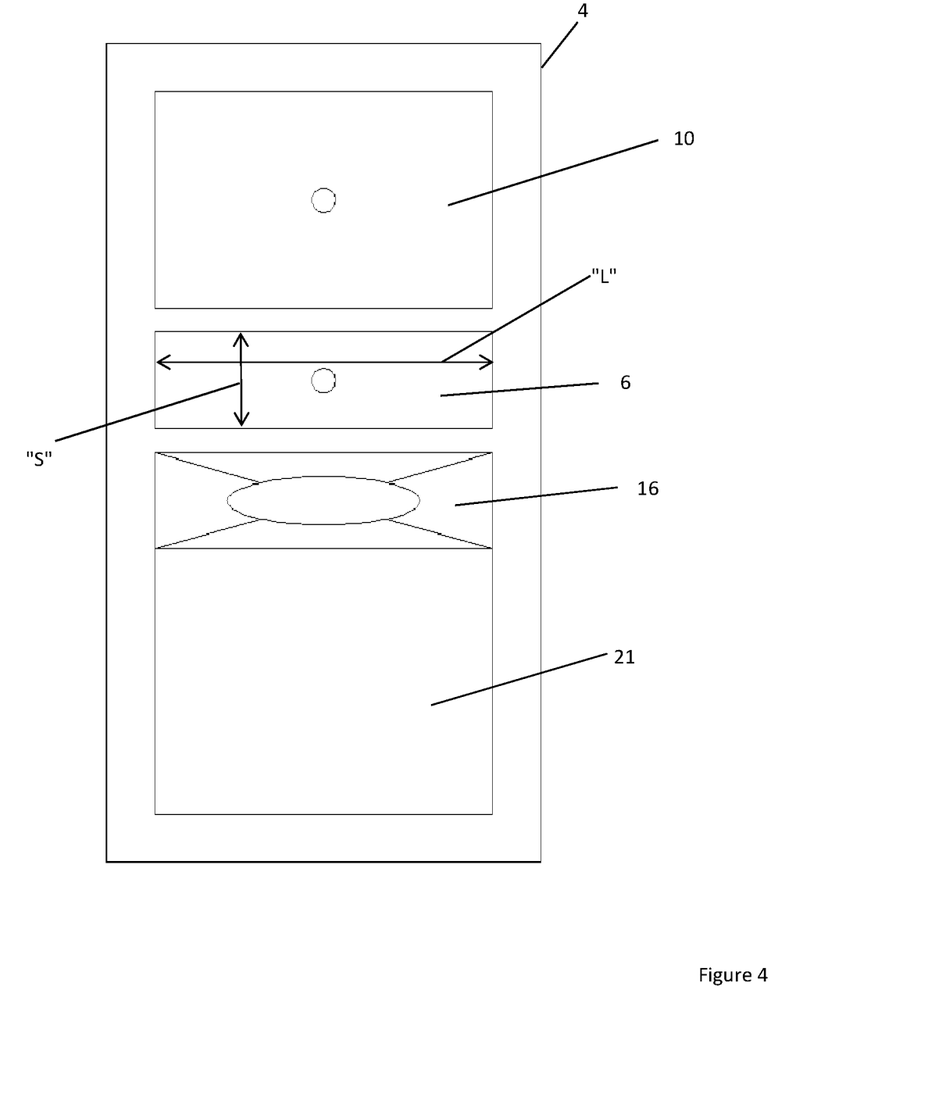
FIG. 4 An overhead view of a device according to FIG. 2.

It is also clearly shown that the structure holder 6 adapted to the object shape takes up a minimal distance to the opening of the metering holder 10, so that the travel path "V" of the coater element 9 can be in turn shortened compared to that of the significantly longer travel path "V" in the prior art. The position of the structure holder 6 adapted to the object shape and of the overflow holder 16 and/or of the metering holder 10 within the process chamber 5 can be variably selected as a whole. It is only essential that the holders are as close together as possible. This can be seen in FIG. 3, where the holders are offset more to the center of the process chamber compared to FIG. 2. In addition, in FIG. 3, the metering holder is also reduced in respect of the construction material volume thereof.

Figure 5A:
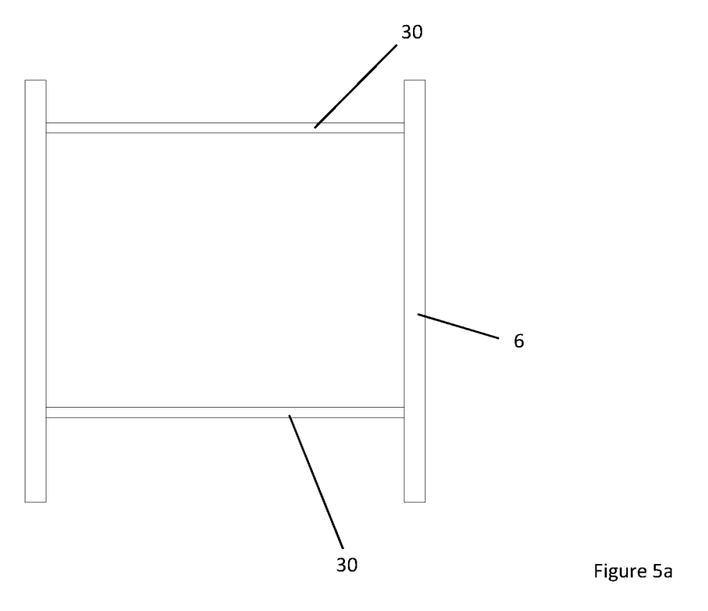
FIG. 5 A schematic view of a structure holder having a movable side wall for enlarging or reducing the structure surface and thus for object adaptation.
Figure 5B:
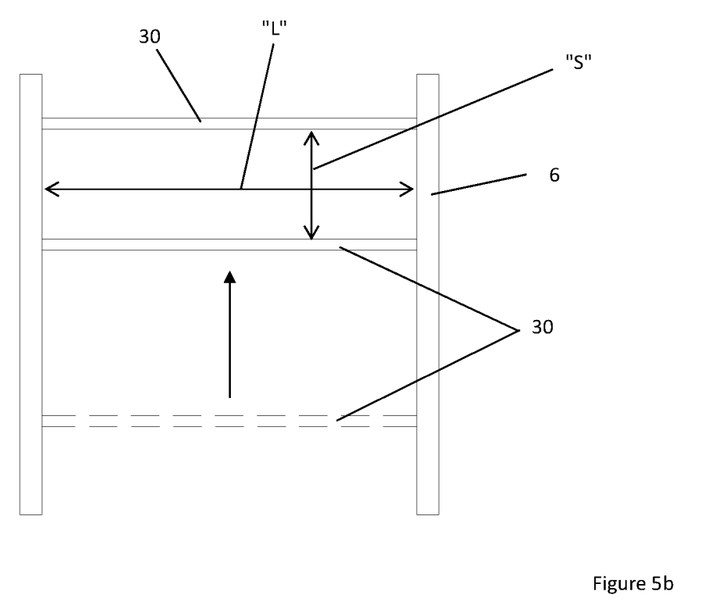

FIG. 5 also shows that a structure holder 6 of modified design for adapting to the object shape has at least one movable side wall 30. In FIG. 5*a*, the side wall 30 is in a position that ensures a maximum construction field. In FIG. 5*b*, by contrast, the side wall 30 is pushed into the interior of the structure holder 6, so that the structure surface is substantially smaller and the volume of the structure holder 6 is thus also reduced.

It is also generally possible to produce the structure holder by a generative construction method and to install cooling channels in the construction chamber walls, said cooling channels having locations that are specifically adapted to the object to be produced in the structure holder 6. The cooling channels can be selected so that particularly critical regions that result from the object 2 are particularly well cooled; that is, not only the structure holder 6 is adapted to the object shape, but the cooling channels of a generatively structured structure holder are also object shape optimized in respect of the length thereof.

Figure 6:
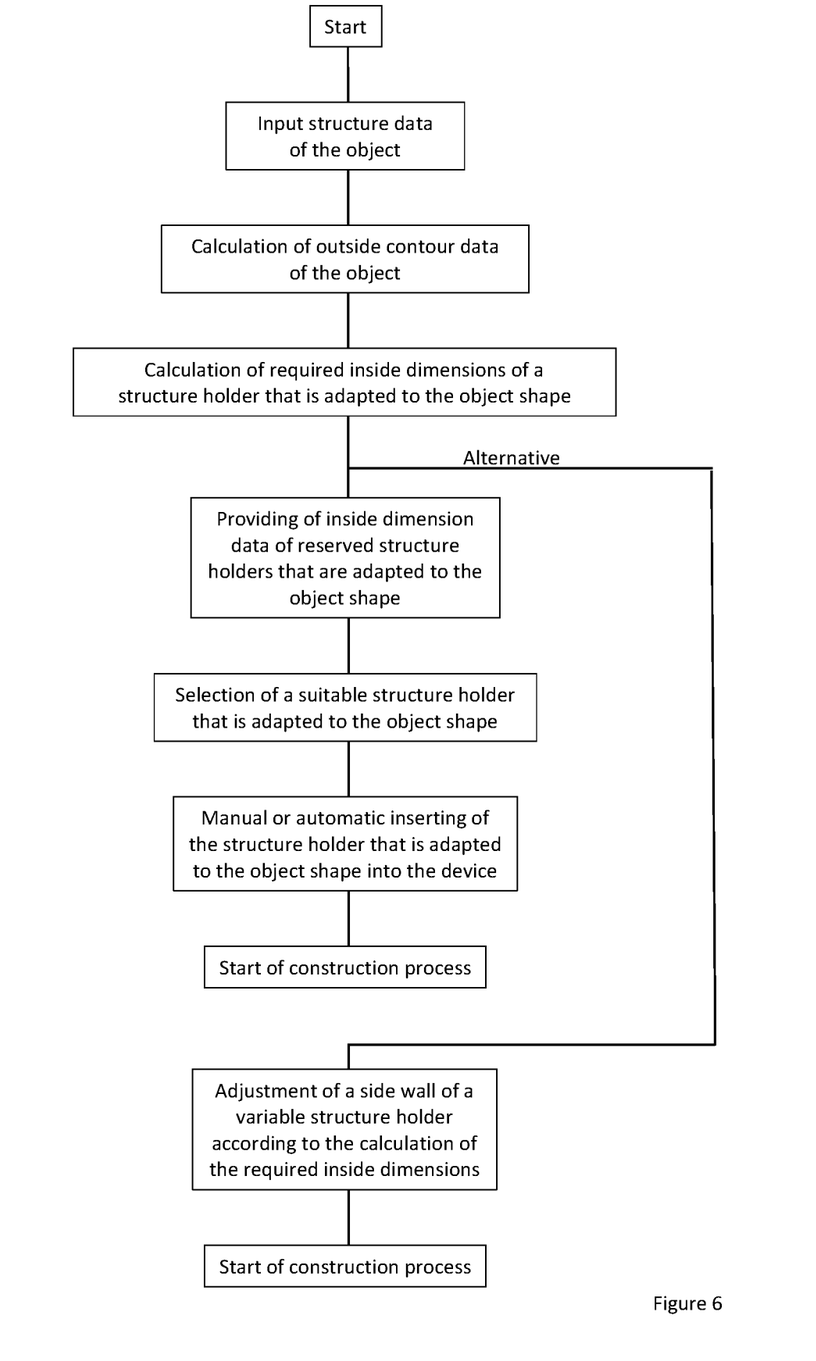
FIG. 6 A schematic process depiction of the method for selecting a structure holder.

FIG. 6 shows a purely schematic process of a method in which either a suitable structure holder is selected as object shape adapted from a plurality of reserved structure holders, or a variable holder is adapted by moving a side wall 30 to the shape of the object.

REFERENCE SIGN LIST

1 Device
2 Object
3 Structure material
4 Housing
5 Process chamber
6 Structure holder
7 Application device
8 Supporting device
9 Coater element
10 Metering holder
12 Irradiation device
13 Laser
14 Scanner apparatus
15 Laser beam
16 Overflow holder
17 Overflow opening
18 Process chamber floor
20 Opening
21 Insert plates
30 Side wall
V Travel path
L Direction
S Coating application direction

The invention claimed is:

1. A device for producing three-dimensional objects by successive solidifying of layers of a structural material with radiation at points corresponding to a respective cross-section of an object, the device comprising:
a housing enclosing a process chamber,
a structure holder arranged in the housing,
an application device configured for applying layers of the structure material to a supporting device in the structure holder or a previously formed layer, having a coater element guided over a structure surface of the structure holder in a coating application direction along a travel path comprising a distance adaptable to a size of the structure holder,
a metering unit configured for feeding the structure material to the application device,
an irradiation device configured for irradiating layers of the structure material at points corresponding to the cross-section of the object with a focused beam of energy, wherein
the structure holder is removable from the device either as a separate removable holder or as a component of an exchange module, and wherein
a plurality of structure holders adapted to the object shape and being of different sizes and/or cross-sectional shapes are configured for introduction into the device, wherein in an assembled end position, a structural dimension of the structure holder arranged in the housing is shorter in the coating application direction than in a direction at a right angle thereto, the structural dimension in the coating application direction corresponding to and being less than the distance of the travel path.

2. The device according to claim 1, wherein a process chamber floor is provided for receiving the plurality of structure holders of varying sizes and/or cross-section shapes and has one or more construction field openings that are shape-adapted or modifiable in respect to the size and/or cross-section shape thereof.

3. The device according to claim 1, wherein the structure holder that is adapted to the object shape is arranged at a minimized distance to the opening of a metering holder of the metering unit.

4. The device according to claim 1, wherein one or more unneeded construction field opening(s) of the process chamber floor are sealed by insert plates.

5. The device according to claim 1, wherein the position of the structure holder that is adapted to the object shape and/or the overflow holder and/or the metering holder are variably selectable within the process chamber.

6. The device according to claim 1, wherein the structure holder that is adapted to the object shape and the overflow holder are arranged under a common opening of the process chamber floor, take up only a part of said opening and a remaining part is covered by at least one insert plate.

7. The device according to claim 1, wherein a metering holder, a structure holder that is adapted to the object shape, and an overflow holder are arranged in operational arrangement permanently in a removable process chamber floor, a process chamber floor insert, or a removable module having a process chamber floor.

8. The device according to claim 1, wherein the travel path of the coater element can be automatically adapted by a structure holder change to the required coating length based on the structure holder that is adapted to the object shape or the selected holder configuration.

9. The device according to claim 1, wherein the side walls of the structure holder that is adapted to the object shape are arranged at a maximum distance of 50 mm, from a location closest to a side wall of an object to be constructed.

10. The device according to claim 9, wherein the side walls of the structure holder that is adapted to the object shape are arranged at a maximum distance 20 mm from the location closest to a side wall of an object to be constructed.

11. The device according to claim 1, wherein the width of the coater element and/or the width of the metering holder is adapted to the dimension of the structure holder at a right angle to the coating application direction.

12. The device according to claim 1, wherein the structure holder that is adapted to the object shape that can be inserted in the device is produced by a generative construction process based on construction data of an object to be produced therein.

13. The device according to claim 1, wherein the structure holder has at least one side wall that can be moved in order to reduce or enlarge the structure surface and that, in the assembly end position of the structure holder is arranged crosswise to the side application direction.

14. The device according to claim 1, wherein the irradiation device is configured for irradiating layers of the structure material at points corresponding to the cross-section of the object with a laser beam.

15. A method for producing three-dimensional objects, the method comprising:
  determining maximum dimensions of an object to be produced;
  saving the maximum dimensions in a memory device;
  providing a plurality of structure holders of different dimensions and saving the structure holder dimensions in a memory;
  selecting a structure holder that is adapted to an object shape from the plurality of reserved structure holders by comparing the maximum dimensions of the object to be produced and the dimensions of the structure holder;
  inserting the selected structure holder that is adapted to the object shape into the device, such that in the assembled end position, the structural dimension thereof is shorter in the coating application direction than in a direction at a right angle thereto;
  determining a minimum distance based on the structural dimension of the selected structure holder in the coating application direction; and
  guiding a coater element over a structure surface of the structure holder in a coating application direction along a travel path corresponding to the minimum distance.

16. A method according to claim 15, wherein each of the plurality of structure holders is reserved in a holder exchange magazine and the structure holder adapted to the object shape is selected by a control device of the device and automatically inserted into the device.

* * * * *